United States Patent
Otani et al.

(10) Patent No.: US 10,155,870 B2
(45) Date of Patent: Dec. 18, 2018

(54) METHOD FOR MANUFACTURING HARDCOAT FILM AND HARDCOAT FILM

(71) Applicant: FUJIFILM Corporation, Tokyo (JP)

(72) Inventors: Taketo Otani, Kanagawa (JP); Katsuyuki Takada, Kanagawa (JP); Masaaki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 131 days.

(21) Appl. No.: 15/460,867

(22) Filed: Mar. 16, 2017

(65) Prior Publication Data

US 2017/0183503 A1 Jun. 29, 2017

Related U.S. Application Data

(63) Continuation of application No. PCT/JP2015/077637, filed on Sep. 29, 2015.

(30) Foreign Application Priority Data

Sep. 30, 2014 (JP) ................................ 2014-202477

(51) Int. Cl.

| | | |
|---|---|---|
| C09D 4/00 | (2006.01) | |
| C09D 7/40 | (2018.01) | |
| B32B 27/20 | (2006.01) | |
| G02B 1/14 | (2015.01) | |
| B05D 1/18 | (2006.01) | |
| B05D 1/28 | (2006.01) | |
| B05D 1/30 | (2006.01) | |
| C09D 5/00 | (2006.01) | |
| C09D 7/62 | (2018.01) | |
| C08K 3/36 | (2006.01) | |
| C08K 7/18 | (2006.01) | |
| C08K 7/26 | (2006.01) | |

(52) U.S. Cl.
CPC ................ *C09D 4/00* (2013.01); *B05D 1/18* (2013.01); *B05D 1/28* (2013.01); *B05D 1/305* (2013.01); *B32B 27/20* (2013.01); *C09D 5/00* (2013.01); *C09D 7/40* (2018.01); *C09D 7/62* (2018.01); *C09D 7/67* (2018.01); *C09D 7/68* (2018.01); *C09D 7/70* (2018.01); *G02B 1/14* (2015.01); *C08K 3/36* (2013.01); *C08K 7/18* (2013.01); *C08K 7/26* (2013.01); *C08K 2201/003* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 2008/0069975 A1 | 3/2008 | Kato et al. | |
| 2009/0136738 A1* | 5/2009 | Kondo | C09D 133/06 428/323 |
| 2012/0019888 A1 | 1/2012 | Mori et al. | |
| 2015/0378062 A1* | 12/2015 | Suzuki | G02B 1/14 349/96 |

FOREIGN PATENT DOCUMENTS

| | | |
|---|---|---|
| CN | 101221262 A | 7/2008 |
| JP | 2001-272503 A | 10/2001 |
| JP | 2002-265866 A | 9/2002 |
| JP | 2002-275409 A | 9/2002 |
| JP | 2002-322430 A | 11/2002 |
| JP | 2004-045971 A | 2/2004 |
| JP | 2004-069760 A | 3/2004 |
| JP | 2005-298754 A | 10/2005 |
| JP | 2007-237483 A | 9/2007 |
| JP | 2009-127009 A | 6/2009 |
| JP | 2009-158450 A | 7/2009 |
| JP | 2009-244860 A | 10/2009 |
| JP | 2010-196014 A | 9/2010 |
| JP | 2011-212554 A | 10/2011 |
| JP | 2013-022515 A | 2/2013 |
| WO | 2010/119755 A1 | 10/2010 |

OTHER PUBLICATIONS

Machine translation of JP 2009-244860, Oct. 2009.*
International Search Report issued in connection with International Patent Application No. PCT/JP2015/077637 dated Dec. 22, 2015.
Written Opinion issued in connection with International Patent Application No. PCT/JP2015/077637 dated Dec. 22, 2015.
Notification of Reason for Refusal issued by the Korean Intellectual Property Office dated Jun. 20, 2018, in connection with Korean Patent Application No. 10-2017-7007974.
Office Action issued by the State Intellectual Property Office of People's Republic of China dated Jun. 1, 2018, in connection with Chinese Patent Application No. 201580053057.0.
Notification of Reasons for Refusal issued by the Japanese Patent office dated Aug. 15, 2017, in connection with Japanese Patent Application No. 2014-202477.

* cited by examiner

*Primary Examiner* — Erma C Cameron
(74) *Attorney, Agent, or Firm* — Edwards Neils, LLC; Jean C. Edwards, Esq.

(57) ABSTRACT

The invention is directed to a method for manufacturing a hardcoat film including a hardcoat layer having a surface of which a water contact angle is 65° or less by applying, drying, and curing a composition for forming the hardcoat layer on a base material film, in which the composition for forming the hardcoat layer contains the components (a) to (d) as defined herein, and, in a case in which a total solid content of the composition for forming the hardcoat layer is set to 100% by mass, a content of the component (b) is 40% to 80% by mass, a content of the component (c) is 10% to 40% by mass, and a content of the component (d) is 10% to 40% by mass.

17 Claims, No Drawings

METHOD FOR MANUFACTURING HARDCOAT FILM AND HARDCOAT FILM

CROSS REFERENCE TO RELATED APPLICATION

This application is continuation of International Application No. PCT/JP2015/077637 filed on Sep. 29, 2015, which was published under PCT Article 21(2) in Japanese, and which claims priority from Japanese Patent Application No. 2014-202477 filed on Sep. 30, 2014, the entire disclosures of all of which are incorporated herein by reference.

BACKGROUND OF THE INVENTION

1. Field of the Invention

The present invention relates to a method for manufacturing a hardcoat film and a hardcoat film.

2. Description of the Related Art

In recent years, for hardcoat films obtained by providing a hardcoat layer on a base material, there has been a strong demand for providing multiple functions by laminating other layers, for example, an antistatic layer, a high-refractive index layer, a layer of low refractive index, a phase difference layer, a bonding layer, and the like depending on applications. In the case of being produced by curing a compound having an ethylenic unsaturated double-bonding group, hardcoat layers have hydrophobic surfaces in many cases. In a case in which other layers are laminated on a hardcoat layer, when the surface of the hardcoat layer serving as an underlayer is hydrophobic, a hydrophilic composition being used as a coating composition for the upper layer does not gradually wet the hardcoat layer and remains in a separated state. Therefore, when the surface of the hardcoat layer is made to be hydrophilic (to have a small contact angle of water), it is possible to form a homogeneous coated film having no cissing on the upper layer.

For example, JP2001-272503A describes that a hardcoat layer is provided by means of coating, and then a corona discharge treatment or a glow discharge treatment is carried out, thereby decreasing the contact angle with respect to water.

In addition, JP2002-265866A describes that a surface treatment such as an alkali treatment or a corona treatment is carried out on the hardcoat layer, thereby improving adhesiveness to a layer of low refractive index as the upper layer.

Meanwhile, in order to make the coated film of the hardcoat layer smooth, a method in which a surfactant (a leveling agent) such as a silicone-based compound or a fluorine group-containing polymer is added to a composition for forming the hardcoat layer is generally used. It is considered that the surfactant is locally present on the surface of the coated film due to its hydrophobicity and decreases the surface tension of the coated film, thereby imparting levelability. However, the above-described surfactant remains on the surface of the hardcoat layer even after the curing of the film and thus hydrophobilizes the surface, which creates a problem in laminating other layers on the hardcoat layer as described above.

As a method for hydrophilizing the surface of the hardcoat layer while maintaining the levelability, JP2001-272503A describes that the addition of an anionic, nonionic, or betainic surfactant decreases the contact angle of water.

In addition, JP2011-212554A describes that a specific amount of a solvent having a boiling point and a viscosity in a specific range is used without using any surfactants.

SUMMARY OF THE INVENTION

However, in a case in which an anionic, nonionic, or betainic surfactant is added as described in JP2001-272503A it is difficult to decrease the surface tension of the hardcoat layer, and there is room for improvement from the viewpoint of the smoothness of the hardcoat layer. In addition, the surfactant has poor properties of being locally present on surfaces and is distributed in the hardcoat layer, and thus there is room for improvement from the viewpoint of hardness.

In a case in which a surface treatment is used as described in JP2001-272503A and JP2002-265866A, during the alkali treatment, the residual amount of the leveling agent sensitively changes due to the curing state of the surface of the hardcoat layer, and thus it is not possible to stably decrease the contact angle of water. In addition, in discharge treatments such as a corona treatment, high energy is radiated, and thus there are cases in which films deform, pinholes are generated, and the in-plane contact angles of water become uneven.

In addition, the water contact angle achieved by the invention described in JP2011-212554A is as high as 80 to 88 degrees and is not enough to be hydrophilic, and thus, in a case in which a coating composition being laminated on the upper layer has properties of easily causing cissing (low viscosity, high surface tension, and the like), the composition easily causes cissing, and the homogeneity of films is impaired.

In consideration of the above-described problems, an object of the present invention is to provide a method for manufacturing a hardcoat film which has a highly hydrophilic surface and has excellent smoothness and hardness and a hardcoat film.

In order to solve the above-described problems, the present inventors carried out intensive studies and found that, when hydrophilic particles are added to a composition for forming a hardcoat layer in addition to using the low-surface tension solvent described in JP2011-212554A without using the specific surfactant as described in JP2001-272503A, it is possible to decrease the contact angle to 65° or less without impairing hardness. However, it was found that, when a low-surface tension solvent is used at the fraction described in JP2011-212554A, added particles agglomerate and thus are mixed with a standard-surface tension solvent, and it is necessary to suppress the content of the low-surface tension solvent. At this time, a decrease in the content of the low-surface tension solvent created a problem of the degradation of the smoothness of the hardcoat layer; however, as a result of additional studies by the present inventors regarding this problem, it was found that, when 10% to 40% by mass of a compound having one alicyclic epoxy group in the molecule and a molecular weight of 300 or less is added in a case in which the total solid content of the composition for forming the hardcoat layer is set to 100% by mass, surprisingly, the smoothness of the hardcoat layer improves and can be satisfied together with the low contact angle.

That is, the present invention relates to inventions having the following constitutions.

<1> A method for manufacturing a hardcoat film including a hardcoat layer having a surface of which a water contact angle is 650 or less, the method comprising: applying a composition for forming the hardcoat layer on a base material film and drying and curing the composition, in which the composition for forming the hardcoat layer includes at least (a) to (d) below, and, in a case in which a total solid content of the composition for forming the hardcoat layer is set to 100% by mass, a content of the following (b) is 40% to 80% by mass, a content of the following (c) is 10% to 40% by mass, and a content of the following (d) is 10% to 40% by mass.

(a) a mixed solvent which is made by mixing a low-surface tension solvent having a surface tension of 10 to 22 mN/m and a standard-surface tension solvent having a surface tension of more than 22 mN/m and in which a content of the low-surface tension solvent is 5% by mass to 40% by mass of a total amount of the mixed solvent (b) a polymerizable compound which has three or more ethylenic unsaturated double-bonding groups in a molecule and in which an equivalent of the ethylenic unsaturated double-bonding groups is 80 to 130

(c) inorganic fine particles having reactivity to epoxy groups or ethylenic unsaturated double-bonding groups (d) a compound which has one or more alicyclic epoxy groups in a molecule and a molecular weight of 300 or less <2> The method for manufacturing a hardcoat film according to <1>, in which the low-surface tension solvent includes one or more selected from tert-butyl alcohol, tetrafluoroethylene, triethylamine, cyclopentane, heptane, methyl(nonafluorobutyl)ether, and ethyl(nonafluorobutyl)ether.

<3> The method for manufacturing a hardcoat film according to <1> or <2>, in which the low-surface tension solvent is tert-butyl alcohol.

<4> The method for manufacturing a hardcoat film according to any one of <1> to <3>, in which the standard-surface tension solvent includes at least one selected from methyl ethyl ketone, acetone, methyl isobutyl ketone, methyl acetate, cyclohexanone, and isopropyl acetate.

<5> The method for manufacturing a hardcoat film according to any one of <1> to <4>, in which an average primary particle diameter of the inorganic fine particles (c) is 10 nm to 100 nm.

<6> The method for manufacturing a hardcoat film according to any one of <1> to <5>, in which the compound (d) further has an ethylenic unsaturated double-bonding group.

<7> A hardcoat film manufactured by the method for manufacturing a hardcoat film according to any one of <1> to <6>.

The present invention provides a method for manufacturing a hardcoat film which has a highly hydrophilic surface and has excellent smoothness and hardness and a hardcoat film. Since the present invention is capable of manufacturing hardcoat films having a hardcoat layer which does not easily cause cissing in coating fluids for forming upper layers, it is possible to manufacture laminate films having a variety of functions.

DESCRIPTION OF THE PREFERRED
EMBODIMENTS

Hereinafter, the present invention will be described in detail.

Meanwhile, in the present specification, numerical ranges expressed using "to" includes numerical values before and after the "to" as the lower limit value and the upper limit value.

In the present specification, "(meth)acrylic groups" refer to any one or both of acrylic groups and methacrylic groups", (Meth)acrylic acids, (meth)acrylamides, (meth)acryloyl groups, and the like will be considered the same way.

[Method for Manufacturing Hardcoat Film]

A method for manufacturing a hardcoat film of the present invention is a method for manufacturing a hardcoat film having a hardcoat layer having a surface of which a water contact angle is 65° or less by applying, drying, and curing a composition for forming the hardcoat layer on a base material film, in which the composition for forming the hardcoat layer includes at least (a) to (d) below, and, in a case in which a total solid content of the composition for forming the hardcoat layer is set to 100% by mass, a content of the following (b) is 40% to 80% by mass, a content of the following (c) is 10% to 40% by mass, and a content of the following (d) is 10% to 40% by mass.

(a) A mixed solvent which is a mixed solvent of a low-surface tension solvent having a surface tension of 10 to 22 mN/m and a standard-surface tension solvent having a surface tension of more than 22 mN/m and in which a content of the low-surface tension solvent is 5% by mass to 40% by mass of a total amount of the mixed solvent (b) A polymerizable compound which has three or more ethylenic unsaturated double-bonding groups in a molecule and in which an equivalent of the ethylenic unsaturated bonding groups is 80 to 130

(c) Inorganic fine particles having reactivity to epoxy groups or ethylenic unsaturated double-bonding groups (d) A compound which has one or more alicyclic epoxy groups in a molecule and a molecular weight of 300 or less The hardcoat film can be manufactured by forming a hardcoat layer by applying, drying, and curing a composition for forming the hardcoat layer on a base material film. The base material film may be peeled off after the formation of the hardcoat layer.

In the present specification, "on the base material film" means "directly on the surface of the base material film" or "through other layers formed on the surface of the base material film".

[Formation of Hardcoat Layer]

The hardcoat layer is formed from a coated film made of the composition for forming the hardcoat layer. The hardcoat layer is a layer formed by, for example, applying the composition for forming the hardcoat layer on the base material film and subjecting the obtained coated film to steps of drying and curing by means of light radiation, heating, or the like.

[Coating Method]

The respective layers in the hardcoat film of the present invention can be formed using coating methods described below, but the method is not limited thereto. Well-known methods such as a dip coating method, an air knife coating method, a curtain coating method, a roller coating method, a wire bar coating method, a gravure coating method, a slide coating method, an extrusion coating method (a die coating method) (refer to the specification of JP2003-164788A), and a micro gravure coating method can be used, and, among these, a micro gravure coating method and a die coating method are preferred.

[Drying and Curing Conditions]

Regarding drying and curing methods in a case in which layers such as the hardcoat layer in the present invention are formed by means of coating, preferred examples will be described below.

In the present invention, it is effective to cure the compound by combining radiation of ionizing radiation and a heat treatment carried out before the radiation, at the same time as the radiation, or after the radiation.

Hereinafter, several patterns of manufacturing steps will be described, but the pattern is not limited thereto. ("–" in the following description indicates that no heat treatments are carried out.)

Before radiation→at the same time as radiation→after radiation (1) Heat treatment→ionizing radiation curing→–
(2) Heat treatment→ionizing radiation curing→heat treatment
(3) –→ionizing radiation curing→heat treatment Additionally, a step in which a heat treatment is carried out at the same time as ionizing radiation curing is also preferred.

In the present invention, as described above, it is preferable to carry out a heat treatment in combination with radiation of ionizing radiation. The heat treatment is not particularly limited as long as constituent layers including a support and the hardcoat layer in the hardcoat film are not impaired, but is preferably 40° C. to 150° C. and more preferably 40° C. to 80° C.

The time taken for the heat treatment varies depending on the molecular weights of components being used, interactions with other components, viscosity, and the like, but is 15 seconds to one hour, preferably 20 seconds to 30 minutes, and most preferably 30 seconds to five minutes.

The type of the ionizing radiation is not particularly limited, and examples thereof include X-rays, electron beams, ultraviolet rays, visible light, infrared rays, and the like, and ultraviolet rays are broadly used. For example, for coated films that are ultraviolet-curable, individual layers are preferably cured by radiating ultraviolet rays at an irradiation level of 10 mJ/cm$^2$ to 1,000 mJ/cm$^2$ using an ultraviolet lamp. During radiation, the energy may be radiated once or can also be separately radiated. Particularly, since performance variation in the plane of coated films is alleviated or curling is improved, it is preferable to radiate ultraviolet rays two or more separate times, and it is preferable to radiate ultraviolet rays at a low irradiance level of 150 mJ/cm$^2$ or less in the initial stage and then radiate ultraviolet rays at a high irradiance level of 50 mJ/cm$^2$ or more and radiate ultraviolet rays at a higher irradiance level in the latter stage than in the initial stage.

<Base Material Film>

As the base material film (also referred to as "support"), it is possible to use glass or polymer films. Examples of materials for polymer films used as the support include cellulose acylate films (for example, cellulose triacetate films (refractive index: 1.48), cellulose diacetate films, cellulose acetate butyrate films, and cellulose acetate propionate films), polyolefins such as polyethylene and polypropylene, polyester-based resin films such as polyethylene terephthalate and polyethylene naphthalate, polyacrylic resin films such as polyether sulfone films and polymethyl methacrylates, polyurethane-based resin films, polyester films, polycarbonate films, polysulfone films, polyether films, polymethylpentene films, polyetherketone films, (meth)acrylonitrile films, polyolefins, polymers having an alicyclic structure (norbornene-based resins (ARTON, manufactured by JSR Corporation), amorphous polyolefins (ZEONEX: trade name, manufactured by Zeon Corporation)), and the like. Among these, triacetyl cellulose, polyethylene terephthalate, and polymers having an alicyclic structure are preferred, and triacetyl cellulose is particularly preferred.

The base material film may be a temporary support that is peeled off after the formation of the hardcoat layer.

The film thickness of the base material film needs to be approximately 1 μm to 1.000 μm, and, since the thickness is preferably reduced in accordance with mobile applications, the film thickness is more preferably 1 μm to 100 μm and still more preferably 1 μm to 30 μm.

<Composition for Forming Hardcoat Layer>

The composition for forming the hardcoat layer in the present invention includes at least the following (a) to (d), and, in a case in which the total solid content of the composition for forming the hardcoat layer is set to 100% by mass, the contents of the following (b) to (d) are respectively 40% to 80% by mass, 10% to 40% by mass, and 10% to 40% by mass.

(a) A mixed solvent which is a mixed solvent of a low-surface tension solvent having a surface tension of 10 to 22 mN/m and a standard-surface tension solvent having a surface tension of more than 22 mN/m and in which the content of the low-surface tension solvent is 5% by mass to 40% by mass of the total amount of the mixed solvent.

(b) A polymerizable compound which has three or more ethylenic unsaturated double-bonding groups in the molecule and in which the equivalent of the ethylenic unsaturated bonding groups is 80 to 130

(c) Inorganic fine particles having reactivity to epoxy groups or ethylenic unsaturated double-bonding groups (d) A compound which has one or more alicyclic epoxy groups in the molecule and a molecular weight of 300 or less.

<<(a) Mixed Solvent>>

The composition for forming the hardcoat layer of the present invention includes a mixed solvent which is a mixed solvent of a low-surface tension solvent having a surface tension of 10 to 22 mN/m and a standard-surface tension solvent having a surface tension of more than 22 mN/m and in which the content of the low-surface tension solvent is 5% by mass to 40% by mass of the total amount of the mixed solvent (also referred to as "mixed solvent (c)").

The present inventors found that the composition for forming the hardcoat layer to which the low-surface tension solvent is added at a certain fraction does not easily cause cissing during coating and is capable of producing hardcoat layers having a uniform and even coated surface. Surprisingly, even when a fluorine-based surfactant or a silicone-based surfactant which is used in the related art is not added to the composition, cissing or unevenness is not caused. While not confined to any theories, it is considered that the low-surface tension solvent, similar to the above-described surfactant in the related art, exhibits a surface-flattening (leveling) function during coating, improves resistance to wind from ambient environments, prevents the easy occurrence of unevenness, and furthermore, is capable of suppressing cissing.

The present inventors found that, even when the hardcoat layer produced using the composition for forming the hardcoat layer of the present invention is used as an underlayer, and furthermore, an upper layer is formed on the surface of the hardcoat layer by means of coating, cissing is not easily caused during coating, and the upper layer having a uniform and even coated surface can be produced. While not confined to any theories, it is considered that the low-surface tension solvent, which exhibits the surface-flattening (leveling) function during coating as described above, volatilizes and disappears during drying in the formation of the film and does not remain in a film to be formed and thus, unlike the surfactants of the related art, does not hydrophobilize the surface of the film and does not easily cause cissing during the formation of the upper layer. On the basis of the above-described characteristics, when a layer formed of the composition for forming the hardcoat layer of the present invention is used as the underlayer and an upper layer is formed on the surface of the layer by means of coating, it is possible to use a wide range of solvents as a solvent for coating fluids for forming the upper layer.

The surface tension of the low-surface tension solvent is 10 to 22 mN/m (10 to 22 dyn/cm), preferably 15 to 21 mN/m, and more preferably 18 to 20 mN/m.

The surface tension of the standard-surface tension solvent is more than 22 mN/m, preferably 23 to 50 mN/m, and more preferably 23 to 40 mN/m.

In addition, the difference between the surface tension of the low-surface tension solvent and the surface tension of the standard-surface tension solvent is preferably 2 mN/m or more, more preferably 3 mN/m or more, and still more preferably 4 to 20 mN/m.

As the solvent, organic solvents are preferably used, and the low-surface tension solvent and the standard-surface tension solvent can be selected from organic solvents. Examples of the organic solvents include alcohols (for example, ethanol and tert-butyl alcohol), amides (for example, N,N-dimethylformamide), sulfoxides (for example, dimethyl sulfoxide), heterocyclic compounds (for example, pyridine), hydrocarbons (for example, heptane, cyclopentane, benzene, hexane, and tetrafluoroethylene), alkyl halides (for example, chloroform and dichloromethane), esters (for example, methyl acetate, butyl acetate, and isopropyl acetate), ketones (for example, acetone, methyl ethyl ketone, and cyclohexanone), ethers (for example, tetrahydrofuran and 1,2-dimethoxyethane), and amines (for example, triethylamine). Two or more organic solvents may be jointly used.

As the low-surface tension solvent, for example, one or more selected from hydrofluoro ethers such as tert-butyl alcohol (0.0195 N/m), tetrafluoroethylene (TFE, 0.0206 N/m), triethylamine (0.0207 N/m), cyclopentane (0.0218 N/m), heptane (0.0196 N/m), Novec7100 (methyl(nonafluorobutyl)ether) (0.0140 N/m) (manufactured by 3M), and Novec7200 (ethyl(nonafluorobutyl)ether) (0.0140 N/m) (manufactured by 3M) are preferably included. Numerical values in parentheses indicate surface tension. Among these, tert-butyl alcohol and tetrafluoroethylene are preferred from the viewpoint of levelability. While not confined to any theories, it is considered that tert-butyl alcohol and tetrafluoroethylene have a relatively high viscosity than other solvents and thus do not easily cause changes in film thicknesses due to wind generated during coating and transportation. The low-surface tension solvent is most preferably tert-butyl alcohol.

The content of the low-surface tension solvent with respect to the total amount of the solvent is 5% by mass to 40% by mass and more preferably 15% by mass to 30% by mass. When the content of the low-surface tension solvent is less than 5% by mass, the levelability is insufficient, and the smoothness of the hardcoat layer is lost, and, when the content is more than 40% by mass, particles agglomerate.

As the standard-surface tension solvent, for example, one or more selected from methyl ethyl ketone (MEK, 0.0239 N/m), acetone (0.0237 N/m), methyl isobutyl ketone (MIBK, 0.0254 N/m), methyl acetate (0.0248 N/m), cyclohexanone (0.0345 N/m), and isopropyl acetate (0.0221 N/m) are preferably included. Numerical values in parentheses indicate surface tension. Among these, a mixed solvent of methyl ethyl ketone, methyl isobutyl ketone, and another standard-surface tension solvent other than methyl ethyl ketone and methyl isobutyl ketone is preferred, and a mixed solvent of methyl ethyl ketone, methyl isobutyl ketone, and methyl acetate is more preferred.

Meanwhile, in the present specification, the surface tensions of the solvents are values described in Solvent Handbook (published by Kodansha Ltd. in 1976). The surface tensions of the solvents are, for example, property values that can be measured using an automatic surface tensionmeter CBVP-A3 manufactured by Kyowa Interface Science Co., Ltd. The measurement may be carried out under a condition of 25° C.

Each of the low-surface tension solvent and the standard-surface tension solvent may be a mixed solvent. At that time, the surface tensions of individual solvents constituting the low-surface tension solvent, which is a mixed solvent, and the surface tensions of individual solvents constituting the standard-surface tension solvent, which is a mixed solvent, need to be in the above-described range.

The boiling point of the low-surface tension solvent is preferably higher than the boiling point of the standard-surface tension solvent. In addition, the solubility of hardcoatable components in the low-surface tension solvent is preferably lower than the solubility of hardcoatable components in the standard-surface tension solvent. Here, as the solubility of hardcoatable components, the solubility of the polymerizable compound (b) among the hardcoatable components is used for comparison. In addition, it is more preferable that the boiling point of the low-surface tension solvent is higher than the boiling point of the standard-surface tension solvent and the solubility of hardcoatable components in the low-surface tension solvent is lower than the solubility of hardcoatable components in the standard-surface tension solvent. This is because the composition for forming the hardcoat layer becomes capable of further suppressing cissing during coating. While not confined to any theories, it is considered that, in the drying step during the formation of films, since the standard-surface tension solvent having a higher solubility of the hardcoatable components and a lower boiling point volatilizes early, and the low-surface tension solvent remains, it is possible to enhance the effect of preventing cissing or unevenness due to the leveling function of the low-surface tension solvent.

The concentration of the solvent with respect to the total mass of the composition for forming the hardcoat layer is preferably 80% to 20% by mass, more preferably 70% to 30% by mass, and still more preferably 60% to 40% by mass.

In the drying step during the formation of the hardcoat layer, the amount of the solvent removed from the composition for forming the hardcoat layer is preferably 95% by mass or more, more preferably 98% by mass or more, still more preferably 99% by mass or more, and particularly preferably substantially 100% by mass of the total amount of the solvent.

<<(b) Polymerizable Compound>>

The composition for forming the hardcoat layer of the present invention includes a polymerizable compound which has three or more ethylenic unsaturated double-bonding groups in the molecule and in which the equivalent of the ethylenic unsaturated bonding groups is 80 to 130 ("polymerizable compound (b)").

Examples of the ethylenic unsaturated double-bonding group include polymerizable functional groups such as (meth)acryloyl groups, vinyl groups, styryl groups, and allyl groups, and, among these, (meth)acryloyl groups and —C(O)OCH=$CH_2$ are preferred, and (meth)acryloyl groups are particularly preferred. When the ethylenic unsaturated double-bonding groups are included, it is possible to maintain high hardness and also impart humidity and heat resistance. Furthermore, when three or more ethylenic unsaturated double-bonding groups are included in the molecule, higher hardness can be developed.

Examples of the polymerizable compound (b) include esters of a polyhydric alcohol and a (meth)acrylic acid, vinyl benzene, derivatives thereof, vinyl sulfone, (meth)acrylamides, and the like. Among these, compounds having three or more (meth)acryloyl groups are preferred from the viewpoint of hardness, and examples thereof include acrylate-based compounds forming high-hardness cured substances that are broadly used in the present industrial field. Examples of the above-described compounds include esters of a polyhydric alcohol and a (meth)acrylic acid, for example, pentaerythritol tetra(meth)acrylates, pentaerythritol tri(meth)acrylates, trimethylolpropane tri(meth)acrylates, EO-modified trimethylolpropane tri(meth)acrylates, PO-modified trimethylolpropane (meth)acrylates, EO-modified tri(meth)acrylate phosphates, trimethylolethane tri(meth)acrylates, ditrimethylolpropane tetra(meth)acrylates, dipentaerythritol tetra(meth)acrylates, dipentaerythritol penta(meth)acrylates, dipentaerythritol hexa(meth)acrylates, pentaerythritol hexa(meth)acrylates, 1,2,3-cyclohexane tetramethacrylate, polyurethanepolyacrylate, polyester polyacrylate, caprolactone-modified tris(acryloxyethyl) isocyanurate, and the like.

Examples of specific compounds of polyfunctional acrylate-based compounds having three or more (meth)acryloyl groups include esterified substances of a polyol such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, KAYARAD GPO-303 manufactured by Nippon Kayaku Co., Ltd., V#400, or V#36095D manufactured by Osaka Organic Chemical Industry Ltd. and a (meth)acrylic acid. In addition, it is also possible to preferably use tri- or higher-functional urethane acrylate compounds of SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, UNIDIC V-4000BA (manufactured by Dainippon Printing Ink Manufacturing), EB-1290K, EB-220, EB-5129, EB-1830, EB-4358 (manufactured by Daicel-UCB Company, Ltd.), HIGH-COAP AU-2010, HIGH-COAP AU-2020 (manufactured by Tokushiki Co., Ltd.), ARONIX M-1960 (manufactured by Toagosci Co., Ltd.), ART RESIN UN-3320HA, UN-3320HC, UN-3320HS, UN-904, and HDP-4T, tri- or higher-functional polyester compounds of ARONIX M-8100, M-8030, M-9050 (manufactured by Toagosei Co., Ltd.), and KBM-8307 (manufactured by Daicel Cytec Co., Ltd.), and the like.

In addition, the polymerizable compound (b) may be constituted of a single compound or a combination of a plurality of compounds can also be used.

The content of the polymerizable compound (b) is 40% to 80% by mass in a case in which the total solid content (all components except for the solvent) of the composition for forming the hardcoat layer in the present invention is set to 100% by mass, but is preferably 50% to 75% by mass and more preferably 55% to 70% by mass. When the content is less than 40% by mass, sufficient hardness cannot be obtained. On the other hand, in a case in which the content is more than 80% by mass, the inorganic fine particles (c) or the compound (d) is insufficient, and thus the contact angle becomes large or the smoothness is impaired.

In the polymerizable compound (b), the equivalent of the ethylenic unsaturated bonding group is 80 to 130. The equivalent of the ethylenic unsaturated bonding group refers to a value obtained by dividing the molecular weight of the polymerizable compound (b) by the number of the ethylenic unsaturated double-bonding groups.

The equivalent of the ethylenic unsaturated double-bonding group in the polymerizable compound (b) is 80 to 130, but is more preferably 80 to 110 and still more preferably 80 to 100.

<<(c) Inorganic Fine Particles>>

The composition for forming a hardcoat layer of the present invention includes inorganic fine particles having reactivity to epoxy groups or ethylenic unsaturated double-bonding groups (also referred to as "inorganic fine particles (c)").

The addition of inorganic fine particles (c) enables the enhancement of the hydrophilicity of cured layers and thus enables a decrease in contact angles. In addition, since the cure shrinkage amount of cured layers can be decreased, it is possible to decrease film curling. Furthermore, when the inorganic fine particles having reactivity to epoxy groups or ethylenic unsaturated double-bonding groups are used, it is possible to improve pencil hardness. Examples of the inorganic fine particles include silica particles, titanium dioxide particles, zirconium oxide particles, aluminum oxide particles, and the like. Among these, silica particles are preferred.

Generally, inorganic fine particles have a low affinity to organic components such as polyfunctional vinyl monomers, and thus, when simply mixed into the composition, may form aggregates or cause cured layers after curing to be easily cracked in some cases. Therefore, for the component (c) in the present invention, in order to increase the affinity between the inorganic fine particles and organic components, the surfaces of the inorganic fine particles are treated using a surface modifier including organic cement.

The surface modifier preferably has a functional group capable of forming bonds with the inorganic fine particles or being adsorbed to the inorganic fine particles and a functional group having a high affinity to organic components in the same molecule. The surface modifier having a functional group capable of forming bonds with inorganic fine particles or being adsorbed to the inorganic fine particles is preferably a metal alkoxide surface modifier such as silane, aluminum, titanium, or zirconium or a surface modifier having an anionic group such as a phosphoric acid group, a sulfuric acid group, a sulfonic acid group, or a carboxylic acid group. Furthermore, the functional group having a high affinity to organic components may be a functional group simply having the same hydrophilicity or hydrophobicity as organic components, but is preferably a functional group capable of being chemically bonded with organic components and particularly preferably an ethylenic unsaturated double-bonding group or a ring-opening polymerizable group.

A preferred inorganic fine particle surface modifier in the present invention is a curable resin having a metal alkoxide or an anionic group and an ethylenic unsaturated double-bonding group or a ring-opening polymerizable group in the same molecule. When the inorganic fine particles are chemically bonded with organic components, the crosslinking density of the hardcoat layer increases, and it is possible to increase pencil hardness.

Typical examples of these surface modifiers include unsaturated double bond-containing coupling agents, phosphoric acid group-containing organic curable resins, sulfuric acid group-containing organic curable resins, carboxylic acid group-containing organic curable resins, all of which will be described below, and the like.

| | |
|---|---|
| S-1 | $H_2C\!=\!C(X)COOC_3H_6Si(OCH_3)_3$ |
| S-2 | $H_2C\!=\!C(X)COOC_2H_4OTi(OC_2H_5)_3$ |
| S-3 | $H_2C\!=\!C(X)COOC_2H_4OCOC_5H_{10}OPO(OH)_2$ |
| S-4 | $(H_2C\!=\!C(X)COOC_2H_4OCOC_5H_{10}O)_2POOH$ |
| S-5 | $H_2C\!=\!C(X)COOC_2H_4OSO_3H$ |
| S-6 | $H_2C\!=\!C(X)COO(C_5H_{10}COO)_2H$ |
| S-7 | $H_2C\!=\!C(X)COOC_5H_{10}COOH$ |
| S-8 | $CH_2CH(O)CH_2OC_3H_6Si(OCH_3)_3$ |

(X represents a hydrogen atom or $CH_3$)

The surfaces of these inorganic fine particles are preferably modified in a solution. When the inorganic fine particles are mechanically and finely dispersed, the surface modifier may be present together, the surface modifier may be added and stirred after the inorganic fine particles are finely dispersed, or, furthermore, the surfaces may be modified (by means of heating, drying and heating, or changing of pH as necessary) before the inorganic fine particles are finely dispersed and then fine dispersion may be carried out. The solution in which the surface modifier is dissolved is preferably a highly polar organic solvent. Specific examples thereof include well-known solvents such as alcohols, ketones, and esters.

The average primary particle diameter of the inorganic fine particles is preferably 10 nm to 100 nm and more preferably 10 to 60 nm. The average particle diameter of fine particles can be obtained from electron micrographs. When the particle diameters of the inorganic fine particles are too small, a hardness improvement effect cannot be obtained, and, when the particle diameters are too large, the composition may be hazed.

The shapes of the inorganic fine particles may be spherical or non-spherical, but two to ten inorganic fine particles are preferably coupled together so as to form non-spherical shapes from the viewpoint of imparting hardness. It is assumed that, when several inorganic fine particles coupled together so as to form chain-like shapes are used, a strong particle network structure is formed, and thus the hardness improves.

Specific examples of the inorganic fine particles include ELECOM V-8802 (spherical silica particles having an average particle diameter of 12 nm manufactured by JGC Corporation), ELECOM V-8803 (irregular silica particles manufactured by JGC Corporation), MiBK-ST (spherical silica particles having an average particle diameter of 10 to 20 nm manufactured by Nissan Chemical Industries, Ltd.), MEK-AC-2140Z (spherical silica particles having an average particle diameter of 10 to 20 nm manufactured by Nissan Chemical Industries, Ltd.), MEK-AC-4130 (spherical silica particles having an average particle diameter of 40 to 50 nm manufactured by Nissan Chemical Industries, Ltd.), MiBK-SD-L (spherical silica particles having an average particle diameter of 40 to 50 nm manufactured by Nissan Chemical Industries, Ltd.), MEK-AC-5140Z (spherical silica particles having an average particle diameter of 70 to 100 nm manufactured by Nissan Chemical Industries, Ltd.), and the like. Among these, irregular ELECOM V-8803 is preferred from the viewpoint of imparting hardness.

In a case in which the total solid content of the composition for forming the hardcoat layer is set to 100% by mass, the content of the inorganic fine particles (c) is 10% to 40% by mass, preferably 15% to 30% by mass, and more preferably 15% to 25% by mass.

<<(d) Compound>>

The composition for forming the hardcoat layer of the present invention includes a compound which has one or more alicyclic epoxy groups in the molecule and a molecular weight of 300 or less (also referred to as "compound (d)").

The alicyclic epoxy group in the compound (d) is not particularly limited as long as the number of the alicyclic epoxy groups is one or more.

The molecular weight of the compound (d) is 300 or less, preferably 250 or less, and more preferably 200 or less. When the molecular weight is more than 300, the number of sites other than the epoxy groups increases, and the hardness deteriorates. In addition, the molecular weight of the compound (d) is preferably 100 or more and more preferably 150 or more since volatilization during the formation of the hardcoat layer is suppressed.

When one or more alicyclic epoxy groups are included, and the molecular weight is set to 300 or less, it is possible to prevent hardness deterioration.

The content of the compound (d) is 10% to 40% by mass, preferably 12% to 35% by mass, and more preferably 15% to 25% by mass in a case in which the total solid content of the composition for forming the hardcoat layer in the present invention is set to 100% by mass. When the content is less than 10% by mass, the smoothness-improving effect is weak, and the surface state of the hardcoat layer deteriorated. On the other hand, in a case in which the content is more than 40% by mass, the hardness decreases.

The compound (d) preferably further has an ethylenic unsaturated double-bonding group. The ethylenic unsaturated double-bonding group is not particularly limited, and examples thereof include (meth)acryloyl groups, vinyl groups, styryl groups, allyl groups, and the like. Among these, (meth)acryloyl groups and $-C(O)OCH\!=\!CH_2$ are preferred, and (meth)acryloyl groups are particularly preferred.

When the compound (d) has the ethylenic unsaturated double-bonding group, a bonding force with the compound (b) is imparted, and thus it is possible to prevent hardness deterioration and suppress bleeding during storage under humidity and heat.

Specific compounds of the compound (d) are not particularly limited as long as one or more alicyclic epoxy groups are included in the molecule and the molecular weight is 300 or less, and it is possible to use bicyclohexyldiepoxide; 3,4,3',4'-diepoxybicyclohexyl, butane tetracarboxylate tetra (3,4-epoxycyclohexylmethyl)-modified s-caprolactone, compounds described in Paragraph "0015" of JP1998-17614A (JP-H10-17614A) or represented by General Formula (1A) or (1B) below, 1,2-epoxy-4-vinylcyclohexane, and the like. Among these, compounds represented by General Formula (1A) or (1B) below are more preferred, and compounds represented by General Formula (1A) below having a low molecular weight are still more preferred.

Meanwhile, isomers of the compounds represented by General Formula (1A) below are also preferred.

When the above-described compounds are used, the smoothness is improved, and high hardness can be maintained.

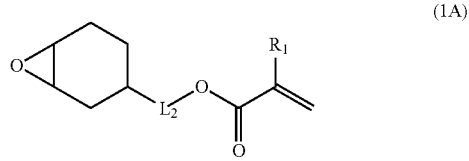

(1A)

In General Formula (1A), $R_1$ represents a hydrogen atom or a methyl group, and $L_2$ represents a divalent aliphatic hydrocarbon group having 1 to 6 carbon atoms.

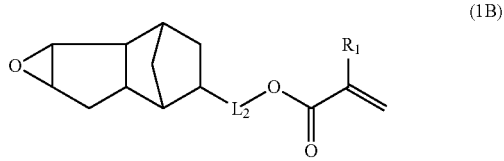

(1B)

In General Formula (1B), $R_1$ represents a hydrogen atom or a methyl group, and $L_2$ represents a divalent aliphatic hydrocarbon group having 1 to 6 carbon atoms.

The divalent aliphatic hydrocarbon group as $L_2$ in General Formulae (1A) and (1B) has 1 to 6 carbon atoms, more preferably has 1 to 3 carbon atoms, and still more preferably has one carbon atom. The divalent aliphatic hydrocarbon group is preferably a linear, branched, or cyclic alkylene group, more preferably a linear or branched alkylene group, and still more preferably a linear alkylene group.

The composition for forming the hardcoat layer includes the (a) to (d), and, additionally, may include additives such as a polymerization initiator.

(Radical Polymerization Initiator)

The composition for forming a hardcoat layer in the present invention may include a radical polymerization initiator.

Compounds having an ethylenic unsaturated group can be polymerized together by means of radiation of ionizing radiation or heating in the presence of a light radical polymerization initiator or a heat radical polymerization initiator. As the light and heat radical polymerization initiators, it is possible to use commercially available compounds which are described in "Advanced UV Curing Technologies" (p. 159, publisher; Kazuhiro Takausu, Publishing company; Technical Information Institute Co., Ltd., published in 1991) or catalogues of Ciba Specialty Chemicals K. K.

As the radical polymerization initiator, specifically, it is possible to use alkylphenone-based photopolymerization initiators (Irgacure651, Irgacure184, DAROCURE1173, Irgacure2959, Irgacure127, DAROCUREMBF, Irgacure907, Irgacure369, and Irgacure379EG), acylphosphine oxide-based photopolymerization initiators (Irgacure819 and LUCIRLN TPO), others (Irgacure784, Irgacure OXE01, Irgacure OXE02, and Irgacure754), and the like.

The amount of the radical polymerization initiator added is in a range of 0.1% to 10% by mass, preferably 1% to 5% by mass, and more preferably 2% to 4% by mass in a case in which the total solid content of the composition for forming a hardcoat layer in the present invention is set to 100% by mass. In a case in which the amount of the radical polymerization initiator added is less than 0.1% by mass, polymerization does not sufficiently proceed, and the hardness of the hardcoat layer is insufficient. On the other hand, in a case in which the amount of the radical polymerization initiator added is more than 10% by mass, UV light does not reach the inside of the film, and the hardness of the hardcoat layer is insufficient. The radical initiator may be used singly, or a combination of a plurality of radical polymerization initiators can also be used.

(Cationic Polymerization Initiator)

The composition for forming a hardcoat layer in the present invention may include a cationic polymerization initiator.

Examples of the cationic polymerization initiator include well-known acid-generating agents and well-known compounds which are used in light initiators for light cationic polymerization, light color extinction agents and light discoloring agents of coloring agents, micro-resists, and the like, mixtures thereof, and the like.

Examples thereof include onium compounds, organic halogen compounds, and disulfone compounds. Specific examples of the organic halogen compounds and the disulfone compounds include the same compounds as described in the section of the above-described radical-generating compounds.

Examples of the onium compounds include diazonium salts, ammonium salts, iminium salts, phosphonium salts, iodonium salts, sulfonium salts, arsonium salts, selenonium salts, and the like, and examples thereof include compounds described in Paragraphs "0058" and "0059" of JP2002-29162A.

The cationic polymerization initiator that is particularly preferably used in the present invention, is an onium salt, diazonium salts, iodonium salts, sulfonium salts, and iminium salts are preferred from the viewpoint of the light sensitivity of photopolymerization initiation, the material stability of compounds, and the like, and, among these, iodonium salts are most preferred from the viewpoint of light resistance.

Specific examples of the onium salts that are preferably used in the present invention include amylated sulfonium salts described in Paragraph "0035" of JP1997-268205A (JP-H09-268205A), diaryliodonium salts and triarylsulfonium salts described in Paragraphs "0010" and "0011" of JP2000-71366A, sulfonium salts of thiobenzoate S-phenyl ester described in Paragraph "0017" of JP2001-288205A, onium salts described in Paragraphs "0030" to "0033" of JP2001-133696A, and the like.

Additional examples thereof include organic metal/organic halides described in Paragraphs "0059" to "0062" of JP2002-29162A, photoacid generators having an o-nitrobenzyl-type protective group, and compounds such as compounds that are light-decomposed and thus generate sulfonic acid (iminosulfonate and the like).

As specific compounds of iodonium salt-based cationic polymerization initiators, it is possible to use B2380 (manufactured by Tokyo Chemical Industry Co., Ltd.), BBI-102 (manufactured by Midori Kagaku Co., Ltd.), WPI-113 (manufactured by Wako Pure Chemical Industries, Ltd.), WPI-124 (manufactured by Wako Pure Chemical Industries, Ltd.), WPI-169 (manufactured by Wako Pure Chemical Industries, Ltd.), WPI-170 (manufactured by Wako Pure Chemical Industries, Ltd.), and DTBPI-PFBS (manufactured by Toyo Gosei Co., Ltd.).

(Uneven Wind Inhibitor)

The composition for forming the hardcoat layer in the present invention may include an uneven wind inhibitor.

(Fluorine-based Surfactant and Silicone-based Surfactant)

The composition for forming the hardcoat layer may include a fluorine-based surfactant and a silicone-based surfactant, but preferably does not substantially include the surfactants in order to enhance hydrophilicity and thus increase the contact angle. The surface of the formed hardcoat layer does not easily become hydrophobic, and cissing does not easily occur when the upper layer is formed.

Specifically, the content of the fluorine-based surfactant and the silicone-based surfactant in the composition for forming the hardcoat layer is 0.05% by mass or less, preferably 0.01% by mass or less, and more preferably 0% by mass of the total mass of the composition for forming the hardcoat layer.

The fluorine-based surfactant is a compound containing fluorine and a compound that is locally present on the surface in the solvent that is used in the composition for forming the hardcoat layer. Examples of the fluorine-based surfactant having a hydrophobic portion include compounds containing fluorine out of the compounds described as orientation-controlling agents in Paragraphs "0028" to "0034" of JP2011-191582A, fluorine-based surfactants described in JP2841611B, fluorine-based surfactants described in Paragraphs "0017" to "0019" of JP2005-272560A, and the like.

Examples of commercially available fluorine-based surfactants include SURFLON manufactured by AGC Seimi Chemical Co., Ltd., MEGAFACE manufactured by DIC Corporation, and FTERGENT manufactured by NEOS Company Limited.

The silicone-based surfactant is a compound containing silicone and a compound that is locally present on the surface in the solvent that is used in the composition for producing optical functional layers.

Examples of the silicone-based surfactant include silicon atom-containing low-molecular-weight compounds such as polymethylphenylsiloxane, polyether-modified silicone oil, polyether-modified dimethylpolysiloxane, dimethyl silicone, diphenyl silicone, hydrogen-modified polysiloxane, vinyl-modified polysiloxane, hydroxy-modified polysiloxane, amino-modified polysiloxane, carboxyl-modified polysiloxane, chloro-modified pollysiloxane, epoxy-modified polysiloxane, methacyloxy-modified polysiloxane, mercapto-modified polysiloxane, fluorine-modified polysiloxane, long-chain alkyl-modified polysiloxane, phenyl-modified polysiloxane, and silicone-modified copolymers.

Examples of commercially available products of the silicone-based surfactant include KF-96 and X-22-945 manufactured by Shin-Etsu Chemical Co., Ltd., Toray silicone DC3PA, Toray silicone DC7PA, Toray silicone SH11PA, Toray silicone SH21PA, Toray silicone SH28PA, Toray silicone SH29PA. Toray silicone SH30PA, Toray silicone FS-1265-300 (all manufactured by Dow Corning Toray Co., Ltd.), TSF-4300, TSF-4440, TSF-4445, TSF-4446, TSF-4452, TSF-4460 (all manufactured by GE Toshiba Silicones Co., Ltd.), polysiloxane polymers KP341 (manufactured by Shin-Etsu Chemical Co., Ltd.), BYK-301, BYK-302, BYK-307, BYK-325, BYK-331, BYK-333, BYK-341, BYK-345, BYK-346, BYK-348, BYK-375 (manufactured by BYK Additives & Instruments), ARON GS-30 (manufactured by Toagosei Co., Ltd.), silicone L-75, silicone L-76, silicone L-77, silicone L-78, silicone L-79, silicone L-520, and silicone L-530 (manufactured by NUC Corporation), and the like.

[Hardcoat Film]

A hardcoat film of the present invention is manufactured using the above-described method for manufacturing a hardcoat film of the present invention.

The hardcoat film of the present invention generally has a constitution in which a hardcoat layer is provided on a transparent support by means of coating as the simplest constitution.

Examples of preferred layer constitutions of the hardcoat film of the present invention will be described below, but are not particularly limited thereto.

Support/hardcoat layer

Support/hardcoat layer/layer of low refractive index

Support/hardcoat layer/antiglare layer (antistatic layer)/layer of low refractive index Support/hardcoat layer/antiglare layer/antistatic layer/layer of low refractive index Support/hardcoat layer/antistatic layer/antiglare layer/layer of low refractive index Support/hardcoat layer (antistatic layer)/antiglare layer/layer of low refractive index Support/hardcoat layer/high-refractive index layer/antistatic layer/layer of low refractive index Support/hardcoat layer/high-refractive index layer (antistatic layer)/layer of low refractive index Support/hardcoat layer/antistatic layer/high-refractive index layer/layer of low refractive index Support/hardcoat layer/middle-refractive index layer/high-refractive index layer (antistatic layer)/layer of low refractive index Support/hardcoat layer/middle-refractive index layer (antistatic layer)/high-refractive index layer/layer of low refractive index Support/hardcoat layer (antistatic layer)/middle-refractive index layer/high-refractive index layer f/layer of low refractive index Support/antistatic layer/hardcoat layer/middle-refractive index layer/high-refractive index layer/layer of low refractive index Antistatic layer/support/hardcoat layer/middle-refractive index layer/high-refractive index layer/layer of low refractive index Here, the antistatic layer and the antiglare layer may be hardcoatable.

The film thickness of the hardcoat layer of the present invention can be selected in accordance with the target hardness, but is preferably 1 to 50 μm. This is because the hardcoat film of the present invention curls only to an extremely small extent and thus does not cause any handling problems even when the hardcoat layer has a thick thickness. Meanwhile, in the case of being used as a polarizer protective film, the thickness of the hardcoat layer is preferably designed to be 3 to 10 μm.

The composition for forming the hardcoat layer of the present invention does not need to include a fluorine-based surfactant or a silicone-based surfactant and thus does not easily cause the cissing of coating composition for forming upper layers and is capable of forming uniform upper layers when being used for the production of laminate films on which an upper layer is laminated as described above. While not confined to any theories, this is considered to be because the low-surface tension solvent does not remain on the surface of the underlayer as described above.

EXAMPLE

Hereinafter, the present invention will be more specifically described using examples. Materials, reagents, mass amounts, fractions thereof, operations, and the like described in the following examples can be appropriately modified within the scope of the gist of the present invention. Therefore, the scope of the present invention is not limited to the following examples.

<Preparation of Hardcoat Layer Coating Fluid>

Hardcoat layer coating fluids A01 to A42 were prepared in compositions shown in Tables 1 and 2. In Tables 1 and 2, "%" indicates "% by mass", numerical values regarding the standard-surface tension solvent and the low-surface tension solvent indicate the content percentages of individual solvents included in the entire mixed solvent, and numerical values regarding other components indicate the content percentages of components in the hardcoat layer coating fluids except for solvents.

TABLE 1

| Hardcoat layer coating fluid | | A01 | A02 | A03 | A04 | A05 | A06 | A07 | A08 | A09 | A10 | A11 |
|---|---|---|---|---|---|---|---|---|---|---|---|---|
| Acrylic monomer | DPHA | 61.00% | 61.00% | 61.00% | 61.00% | 61.00% | 61.00% | 61.00% | 61.00% | 61.00% | 61.00% | 61.00% |
| | ATMMT | | | | | | | | | | | |
| | DA-314 | | | | | | | | | | | |
| | HEMA | | | | | | | | | | | |
| Inorganic fine particles | ELECOM V-8802 | 15.00% | 15.00% | 15.00% | 15.00% | 15.00% | 15.00% | 15.00% | 15.00% | 15.00% | 15.00% | 15.00% |
| | ELECOM V-8803 | | | | | | | | | | | |
| | MiBK-ST | | | | | | | | | | | |
| Epoxy monomer | 3,4-Epoxycyclohexylmethyl methacrylate | 20.00% | 20.00% | 20.00% | 20.00% | 20.00% | 20.00% | 20.00% | 20.00% | 20.00% | 20.00% | 20.00% |
| | 3,4-Epoxycyclohexylmethyl acrylate | | | | | | | | | | | |
| | 3,4-Epoxycyclohexylbutyl methacrylate | | | | | | | | | | | |
| | Bicyclohexyldiepoxide; | | | | | | | | | | | |
| | 3,4,3',4'-diepoxybicyclohexyl | | | | | | | | | | | |
| | 3'4'-Epoxycyclohexylmethyl | | | | | | | | | | | |
| | 3,4-epoxycyclohexanecarboxylate | | | | | | | | | | | |
| | Butane tetracarboxylate tetra(3,4-epoxycyclohexylmethyl)-modified ε-caprolactone | | | | | | | | | | | |
| | Epoxidized 3-cyclohexene-1,2-dicarboxylate | | | | | | | | | | | |
| | bis(3-cyclohexenylmethyl)-modified ε-caprolactone | | | | | | | | | | | |
| | 1,6-Bis(2,3-epoxypropan-1-yloxy)naphthalene | | | | | | | | | | | |
| | Glycerol triglycidyl ether | | | | | | | | | | | |
| | N,N,N-Diglycidyl-4-glycidyloxyaniline | | | | | | | | | | | |
| Initiator | IRGACURE127 | 3.00% | 3.00% | 3.00% | 3.00% | 3.00% | 3.00% | 3.00% | 3.00% | 3.00% | 3.00% | 3.00% |
| Photoacid generator | IRGACURE290 | 1.00% | 1.00% | 1.00% | 1.00% | 1.00% | 1.00% | 1.00% | 1.00% | 1.00% | 1.00% | 1.00% |
| | IRGACURE270 | | | | | | | | | | | |
| | B2380 | | | | | | | | | | | |
| Uneven wind inhibitor | FP-1 | | | | | | | | | | | |
| | KF-96L-20cs | | | | | | | | | | | |
| Standard-surface tension solvent | MEK | 35% | 35% | 35% | 35% | 35% | 35% | 52% | 33% | 35% | 55% | 30% |
| | Acetone | | | | | | | | | | | |
| | MiBK | 25% | 25% | 25% | 25% | 25% | 25% | 24% | 15% | 25% | 25% | 14% |
| | Methyl acetate | 20% | 20% | 20% | 20% | 20% | 20% | 19% | 12% | 20% | 20% | 11% |
| Low-surface tension solvent | tert-Butyl alcohol | | | | | | | 5% | 40% | 20% | | 45% |
| | Tetrafluoroethylene | | | | | 20% | | | | | | |
| | Triethylamine | | | | 20% | | | | | | | |
| | Cyclopentane | | | 20% | | | | | | | | |
| | Novec7100 | | 20% | | | | | | | | | |
| | Novec7200 | 20% | | | | | | | | | | |
| | Heptane | | | | | | 20% | | | | | |
| Solid content concentration | | 50% | 50% | 50% | 50% | 50% | 50% | 50% | 50% | 50% | 50% | 50% |

TABLE 1-continued

| | Hardcoat layer coating fluid | A12 | A13 | A14 | A15 | A16 | A17 | A18 | A19 | A20 | A21 |
|---|---|---|---|---|---|---|---|---|---|---|---|
| Acrylic monomer | DPHA | 61.00% | 61.00% | 66.00% | 41.00% | 61.00% | 71.00% | 41.00% | 31.00% | | 31.00% |
| | ATMMT | | | | | | | | 30.00% | 64.00% | 30.00% |
| | DA-314 | | | | | | | | | | |
| | HEMA | | | | | | | | | | |
| Inorganic fine particles | ELECOM V-8802 | 15.00% | 15.00% | | 40.00% | 15.00% | | | | | |
| | ELECOM V-8803 | | | 10.00% | | | 5.00% | 15.00% | 15.00% | 15.00% | 15.00% |
| | MBK-ST | | | | | | | | | | |
| Epoxy monomer | 3,4-Epoxycyclohexylmethyl methacrylate | 20.00% | 20.00% | 20.00% | 15.00% | 20.00% | 20.00% | 40.00% | 20.00% | 20.00% | 20.00% |
| | 3,4-Epoxycyclohexylmethyl acrylate | | | | | | | | | | |
| | 3,4-Epoxycyclohexylbutyl methacrylate | | | | | | | | | | |
| | Bicyclohexyldiepoxide; 3,4,3',4'-diepoxybicyclohexyl | | | | | | | | | | |
| | 3'4'-Epoxycyclohexylmethyl 3,4-epoxycyclohexanecarboxylate | | | | | | | | | | |
| | Butane tetracarboxylate tetra(3,4-epoxycyclohexylmethyl)-modified ε-caprolactone | | | | | | | | | | |
| | Epoxidized 3-cyclohexene-1,2-dicarboxylate bis(3-cyclohexenylmethyl)-modified ε-caprolactone | | | | | | | | | | |
| | 1,6-Bis(2,3-epoxypropan-1-yloxy) naphthalene | | | | | | | | | | |
| | Glycerol triglycidyl ether | | | | | | | | | | |
| | N,N-Diglycidyl-4-glycidyloxyaniline | | | | | | | | | | |
| Initiator | IRGACURE127 | | | | | | | | | | |
| Photoacid generator | IRGACURE290 | 3.00% | 3.00% | 3.00% | 3.00% | 3.00% | 3.00% | 3.00% | 3.00% | 3.00% | 3.00% |
| | IRGACURE270 | | | | | | | | | | |
| | B2380 | | | | | | | | | | |
| Uneven wind inhibitor | FP-1 | 1.00% | 1.00% | 1.00% | 1.00% | 1.00% | 1.00% | 1.00% | 1.00% | 1.00% | 1.00% |
| | KF-96L-20cs | | | | | | | | | | |
| Standard-surface tension solvent | MEK | 35% | 35% | 35% | 35% | 35% | 35% | 35% | 35% | 35% | 35% |
| | Acetone | 25% | 25% | 25% | 25% | 25% | 25% | 25% | 25% | 25% | 25% |
| | MiBK | 20% | 20% | 20% | 20% | 20% | 20% | 20% | 20% | 20% | 20% |
| | Methyl acetate | 20% | 20% | 20% | 20% | 20% | 20% | 20% | 20% | 20% | 20% |
| Low-surface tension solvent | tert-Butyl alcohol | | | | | | | | | | |
| | Tetrafluoroethylene | | | | | | | | | | |
| | Triethylamine | | | | | | | | | | |
| | Cyclopentane | | | | | | | | | | |
| | Novec7100 | | | | | | | | | | |
| | Novec7200 | | | | | | | | | | |
| | Heptane | | | | | | | | | | |
| Solid content concentration | | 50% | 50% | 50% | 50% | 50% | 50% | 50% | 50% | 50% | 50% |

TABLE 2

| Hardcoat layer coating fluid | | A22 | A23 | A24 | A25 | A26 | A27 | A28 | A29 | A30 | A31 | A32 |
|---|---|---|---|---|---|---|---|---|---|---|---|---|
| Acrylic monomer | DPHA | 64.00% | | | | | | | | | | |
| | ATMMT | | 31.00% | | 61.00% | 61.00% | 61.00% | 61.00% | 61.00% | 61.00% | 61.00% | 61.00% |
| | DA-314 | | 30.00% | | | | | | | | | |
| | HEMA | | | 64.00% | | | | | | | | |
| Inorganic fine particles | ELECOM V-8802 | 15.00% | 15.00% | 15.00% | | | | | | | | |
| | ELECOM V-8803 | | | | 15.00% | 15.00% | 15.00% | 15.00% | 15.00% | 15.00% | 15.00% | 15.00% |
| | MiBK-ST | 20.00% | 20.00% | 20.00% | | | | | | | | |
| Epoxy monomer | 3,4-Epoxycyclohexylmethyl methacrylate | | | | 20.00% | | | | | | | |
| | 3,4-Epoxycyclohexylmethyl acrylate | | | | | 20.00% | | | | | | |
| | 3,4-Epoxycyclohexylbutyl methacrylate | | | | | | 20.00% | | | | | |
| | Bicyclohexyldiepoxide; 3,4,3',4'-diepoxybicyclohexyl | | | | | | | 20.00% | | | | |
| | 3'4'-Epoxycyclohexylmethyl 3,4-epoxycyclohexanecarboxylate | | | | | | | | 20.00% | | | |
| | Butane tetracarboxylate tetra(3,4-epoxycyclohexylmethyl)-modified ε-caprolactone | | | | | | | | | 20.00% | | |
| | Epoxidized 3-cyclohexene-1,2-dicarboxylate bis(3-cyclohexenylmethyl)-modified ε-caprolactone | | | | | | | | | | 20.00% | |
| | 1,6-Bis(2,3-epoxypropan-1-yloxy) naphthalene | | | | | | | | | | | 20.00% |
| | Glycerol triglycidyl ether | | | | | | | | | | | |
| | N,N,N-Diglycidyl-4-glycidyloxyaniline | | | | | | | | | | | |
| Initiator | IRGACURE127 | 3.00% | 3.00% | 3.00% | 3.00% | 3.00% | 3.00% | 3.00% | 3.00% | 3.00% | 3.00% | 3.00% |
| | IRGACURE290 | | | | | | | | | | | |
| Photoacid generator | IRGACURE270 | | | | | | | | | | | |
| | B2380 | 1.00% | 1.00% | 1.00% | 1.00% | 1.00% | 1.00% | 1.00% | 1.00% | 1.00% | 1.00% | 1.00% |
| Uneven wind inhibitor | FP-1 | | | | | | | | | | | |
| | KF-96L-20cs | 35% | 35% | 35% | 35% | 35% | 35% | 35% | 35% | 35% | 35% | 35% |
| Standard-surface tension solvent | MEK | 25% | 25% | 25% | 25% | 25% | 25% | 25% | 25% | 25% | 25% | 25% |
| | Acetone | 20% | 20% | 20% | 20% | 20% | 20% | 20% | 20% | 20% | 20% | 20% |
| | MiBK | 20% | 20% | 20% | 20% | 20% | 20% | 20% | 20% | 20% | 20% | 20% |
| | Methyl acetate | | | | | | | | | | | |
| | tert-Butyl alcohol | | | | | | | | | | | |
| Low-surface tension solvent | Tetrafluoroethylene | | | | | | | | | | | |
| | Triethylamine | | | | | | | | | | | |
| | Cyclopentane | | | | | | | | | | | |
| | Novec7100 | 50% | 50% | 50% | 50% | 50% | 50% | 50% | 50% | 50% | 50% | 50% |
| | Novec7200 | | | | | | | | | | | |
| | Heptane | | | | | | | | | | | |
| Solid content concentration | | 50% | 50% | 50% | 50% | 50% | 50% | 50% | 50% | 50% | 50% | 50% |

TABLE 2-continued

| Hardcoat layer coating fluid | | A33 | A34 | A35 | A36 | A37 | A38 | A39 | A40 | A41 | A42 |
|---|---|---|---|---|---|---|---|---|---|---|---|
| Acrylic monomer | DPHA | 61.00% | 81.00% | 76.00% | 40.00% | 60.998% | 60.998% | 60.95% | 60.999% | 61.00% | 60.95% |
| | ATMMT | | | | | | | | | | |
| | DA-314 | | | | | | | | | | |
| | HEMA | | | | | | | | | | |
| Inorganic fine particles | ELECOM V-8802 | 15.00% | 15.00% | 15.00% | 11.00% | 15.00% | 15.00% | 15.00% | 15.00% | 15.00% | 15.00% |
| | ELECOM V-8803 | | | | | | | | | | |
| | MBK-ST | | | | | | | | | | |
| Epoxy monomer | 3,4-Epoxycyclohexylmethyl methacrylate | | | 5.00% | 45.00% | 20.00% | 20.00% | 20.00% | 20.00% | 20.00% | 20.00% |
| | 3,4-Epoxycyclohexylmethyl acrylate | | | | | | | | | | |
| | 3,4-Epoxycyclohexylbutyl methacrylate | | | | | | | | | | |
| | Bicyclohexyldiepoxide; | | | | | | | | | | |
| | 3,4,3',4'-diepoxybicyclohexyl | | | | | | | | | | |
| | 3'4'-Epoxycyclohexylmethyl | | | | | | | | | | |
| | 3,4-epoxycyclohexanecarboxylate | | | | | | | | | | |
| | Butane tetracarboxylate | | | | | | | | | | |
| | tetra(3,4-epoxycyclohexylmethyl)-modified | | | | | | | | | | |
| | ε-caprolactone | | | | | | | | | | |
| | Epoxidized | | | | | | | | | | |
| | 3-cyclohexene-1,2-dicarboxylate | 20.00% | | | | | | | | | |
| | bis(3-cyclohexenylmethyl)-modified | | | | | | | | | | |
| | ε-caprolactone | | | | | | | | | | |
| | 1,6-Bis(2,3-epoxypropan-1-yloxy) naphthalene | | | | | | | | | | |
| | Glycerol triglycidyl ether | | | | | | | | | | |
| | N,N-Diglycidyl-4-glycidyloxyaniline | | | | | | | | | | |
| Initiator | IRGACURE127 | 3.00% | 3.00% | 3.00% | 3.00% | 3.00% | 3.00% | 3.00% | 3.00% | 3.00% | 3.00% |
| | IRGACURE290 | | | | | | | | | | |
| Photoacid generator | IRGACURE270 | 1.00% | 1.00% | 1.00% | 1.00% | 1.00% | 1.00% | 1.00% | 1.00% | 1.00% | 1.00% |
| | FP-1 | | | | | 0.002% | 0.002% | 0.05% | 0.001% | 0.001% | 0.05% |
| Uneven wind inhibitor | KF-96L-20cs | | | | | | | | | | |
| Standard-surface tension solvent | MEK | 35% | 35% | 35% | 35% | 55% | 35% | 35% | 55% | 35% | 35% |
| | Acetone | 25% | 25% | 25% | 25% | 25% | 25% | 25% | 25% | 25% | 25% |
| | MIBK | 20% | 20% | 20% | 20% | 20% | 20% | 20% | 20% | 20% | 20% |
| | Methyl acetate | 20% | 20% | 20% | 20% | | 20% | 20% | | 20% | 20% |
| Low-surface tension solvent | tert-Butyl alcohol | | | | | | | | | | |
| | Triethylamine | | | | | | | | | | |
| | Tetrafluoroethylene | | | | | | | | | | |
| | Cyclopentane | | | | | | | | | | |
| | Novec7100 | | | | | | | | | | |
| | Novec7200 | | | | | | | | | | |
| | Heptane | | | | | | | | | | |
| Solid content concentration | | 50% | 50% | 50% | 50% | 50% | 50% | 50% | 50% | 50% | 50% |

The compounds shown in Tables 1 and 2 will be described below.
(Acrylic Monomers)
DPHA: KAYARAD DPHA (manufactured by Nippon Kayaku Co., Ltd.) (hexafunctional/equivalent of ethylenic unsaturated double-bonding group: 96)
ATMMT: Pentaerythritol tetraacrylate (manufactured by Shin-Nakamura Chemical Co., Ltd.) (tetrafunctional/equivalent of ethylenic unsaturated double-bonding group: 88)
DA-314: (manufactured by Nagase ChemteX Corporation) (trifunctional/equivalent of ethylenic unsaturated double-bonding group: 159)
HEMA: 2-Hydroxyethyl methacrylate (monofunctional/equivalent of ethylenic unsaturated double-bonding group: 131)
(Inorganic Fine Particles)
ELECOM V-8802: MiBK dispersion liquid, an average particle diameter of 12 nm, a polymerizable group attached, a solid content of spherical silica particles: 40% by mass (manufactured by JGC Corporation)
ELECOM V-8803: MiBK dispersion liquid, a polymerizable group attached, a solid content of irregular (a form coupled in a chain shape) silica particles: 40% by mass (manufactured by JGC Corporation)
MiBK-ST: MiBK dispersion liquid, an average particle diameter of 10 to 20 nm, a solid content of silica particles not provided with a reactive group: 30% by mass (manufactured by Nissan Chemical Industries, Ltd.)
(Epoxy Monomers)
3,4-Epoxycyclohexylmethyl methacrylate: CYCLOMER M100 (manufactured by Daicel Corporation, molecular weight: 196)
3,4-Epoxycyclohexylmethyl acrylate
3,4-Epoxycyclohexylbutyl methacrylate
Bicyclohexyldiepoxide; 3,4,3',4'-diepoxybicyclohexyl: CELLOXIDE 8000 (manufactured by Daicel Corporation, molecular weight: 194)
3',4'-Epoxycyclohexylmethyl 3,4-epoxycyclohexanecarboxylate: CELLOXIDE 2021P (manufactured by Daicel Corporation, molecular weight: 252)
Butane tetracarboxylate tetra(3,4-epoxycyclohexylmethyl)-modified ε-caprolactone: EPOLEAD GT401 (manufactured by Daicel Corporation, molecular weight: 789)
Epoxidized 3-cyclohexene-1,2-dicarboxylate bis(3-cyclohexenylmethyl)-modified ε-caprolactone: EPOLEAD GT301 (manufactured by Daicel Corporation, molecular weight: 519)
1,6-Bis(2,3-epoxypropan-1-yloxy)naphthalene: EPICLON HP-4032D (manufactured by DIC Corporation, molecular weight: 272)
Glycerol triglycidyl ether: DENACOL EX-314 (manufactured by Nagase ChemteX Corporation, molecular weight: 260)
N,N-Diglycidyl-4-glycidyloxyaniline: jER630 (manufactured by Mitsubishi Chemical Corporation, molecular weight: 277)
(Polymerization Initiator)
IRGACURE127: Acylphosphine oxide-based photopolymerization initiator (manufactured by BASF)
(Photoacid Generator)
IRGACURE290: Sulfonium salt-based cationic polymerization initiator (manufactured by BASF)
IRGACURE270: Sulfonium salt-based cationic polymerization initiator (manufactured by BASF)
B2380: Iodonium salt-based cationic polymerization initiator (manufactured by Tokyo Chemical Industry Co., Ltd.)
(Uneven Wind Inhibitors)
FP-1: The following fluorine-containing compound (Mw: 20,000)
KF-96L-20cs: Dimethyl polysiloxane (Shin-Etsu Chemical Co., Ltd.)

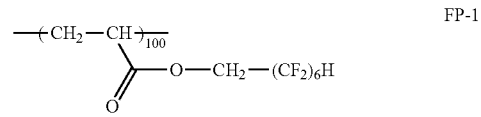

Solvents used in Tables 1 and 2 and surface tensions thereof are as described below.
(Standard-Surface Tension Solvent)
MEK: (23.9 mN/m)
Acetone: (23.7 mN/m)
MiBK: (25.4 mN/m)
Methyl acetate: (24.8 mN/m)
(Low-Surface Tension Solvent)
tert-Butyl alcohol: (19.5 mN/m)
Tetrafluoroethylene: (20.6 mN/m)
Triethylamine: (20.7 mN/m)
Cyclopentane: (21.8 mN/m)
Novec7100: (14.0 mN/m)
Novec7200: (14.5 mN/m)
Heptane (19.6 mN/m)
(Production of Acryl Base Material Films Having Film Thickness of 30 μm)
Methyl methacrylate (MMA) (8,000 g), methyl 2-(hydroxymethyl)acrylate (MHMA) (2.000 g), and toluene (10,000 g) as a polymerization solvent were prepared in a reaction tank having an inner volume of 30 L which was equipped with a stirring device, a temperature sensor, a cooling pipe, and a nitrogen introduction pipe and were heated up to 105° C. under the flow of nitrogen. When reflux began in response to the heating, t-amyl peroxyisononanoate (10.0 g) were added thereto as a polymerization initiator, solution polymerization was caused to progress under reflux of approximately 105° C. to 110° C. while adding a solution made up of t-amyl peroxyisononanoate (20.0 g) and toluene (100 g) dropwise for two hours, and furthermore, aging was carried out for four hours. The polymerization reaction percentage was 96.6%, and the content percentage (weight ratio) of MHMA in the obtained polymer was 20.0%.
Next, a stearyl phosphate/distearyl phosphate mixture (manufactured by Sakai Chemical Industry Co., Ltd., Phoslex A-18) (10 g) was added to the obtained polymerization solution as a cyclization catalyst, and a cyclization condensation reaction was caused to progress for five hours under reflux of approximately 80° C. to 100° C.
Next, the obtained polymerized solution was introduced into a vent-type screw biaxial extruder (φ=29.75 mm, L/D=30) having a paddle temperature of 260° C., a rotation speed of 100 rpm, a degree of decompression of 13.3 to 400 hPa (10 to 300 mmHg), one rear vent, and four fore vent at a treatment speed of 2.0 kg/hour in terms of the amount of a resin, and a cyclization condensation reaction and devolatilization were carried out in the extruder. Next, after the end of the devolatilization, the resin in a thermally-melted state remaining in the extruder was discharged from the tip of the extruder and was pelletized using a pelletizer, thereby obtaining transparent pellets made of an acrylic resin having a lactone ring structure in the main chain. The weight-average molecular weight of this resin was 148,000, the melt flow rate (obtained according to JIS K7120 at a test temperature of 240° C. and a load of 10 kg, which shall apply to the subsequent manufacturing examples) was 11.0 g/10 minutes, and the glass transition temperature was 130° C.

Next, the obtained pellets and an AS resin (manufactured by Toyo Styrene Co., Ltd., trade name: TOYO AS AS20) were kneaded using a monoaxial extruder ($\phi$=30 mm) in a weight ratio of 90/10 (pellets/AS resin), thereby obtaining transparent pellets having a glass transition temperature of 127° C.

The pellets of the resin composition produced above were melted and extruded from a coat hanger-type T die using a biaxial extruder, thereby producing a resin film having a thickness of approximately 120 μm.

Next, the obtained non-stretched resin film was biaxially stretched at the same time 2.0 times in the machine direction (longitudinal direction) and 2.0 times in the horizontal direction (width direction), thereby producing a polarizer protective film. The acryl base material film obtained as described above had a thickness of 30 μm, a full light transmittance of 92%, a haze of 0.25%, and a glass transition temperature of 127° C.

(Provision of Hardcoat Layer by Means of Coating)

A 25 μm-thick triacetyl cellulose film was coiled in a roll form, the hardcoat layer coating fluids A01 to A42 were used, and hardcoat films S01 to S42 were produced. In addition, the 30 μm-thick acryl base material film produced above was coiled in a roll form, the coating fluid A09 was used, and a hardcoat film S43 was produced.

Specifically, the respective coating fluids were applied using a die coating method in which the slot die described in Example 1 of JP2006-122889A was used under a condition of a transportation speed of 30 m/minute and were dried at 60° C. for 150 seconds, furthermore, the coated layers were cured by radiating ultraviolet rays at an illuminance of 400 mW/cm² and an irradiance level of 500 mJ/cm² using a 160 W/cm air-cooling metal halide lamp (manufactured by Eye Graphics Co., Ltd.) at an oxygen concentration of approximately 0.1% by volume under nitrogen purging, hardcoat layers were formed and were then coiled.

(Surface States of Hardcoat Layers)

For the layers after the coating, surface states were visually confirmed. The results are shown in Tables 3 and 4.

A: There was no uneven drying or wrinkles on the surface.

B: Uneven drying was slightly shown, but the hardcoat layer was available with no problems.

C: There was uneven drying or unevenness to a greater extent than in B, and the hardcoat layer was not suitable for use.

D: Uneven drying or unevenness diffused on the surface, and the hardcoat layer was not suitable for use.

E: Uneven drying or unevenness was generated throughout the surface, and the hardcoat layer was not suitable for use.

(Cissing when Laminated Above)
(Preparation of Coating Fluid for Lamination Ln-1)

Individual components were mixed together as described below and were dissolved into a mixture of MEK/MMPG-Ac (90/10, mass ratio), thereby preparing a layer of low refractive index coating fluid having a solid content of 1% by mass.

(Composition of Ln-1)

| | |
|---|---|
| Perfluoroolefin copolymer described below (P-1) | 15.0 g |
| DPHA | 7.0 g |
| RMS-033 | 5.0 g |
| Fluorine-containing monomer described below (M-1) | 20.0 g |
| Hollow silica particles (in terms of solid content) | 50.0 g |
| IRGACURE127 | 3.0 g |

The compounds used will be described below.

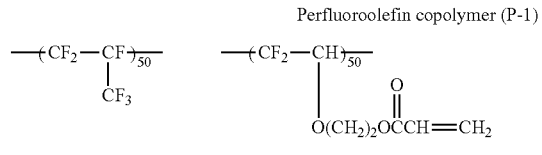

Perfluoroolefin copolymer (P-1)

M.W. 50000

In the structural formula, 50:50 is a molar ratio.

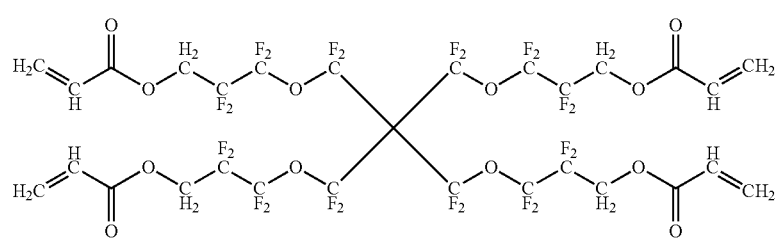

Fluorine-containing monomer (M-1)

The produced hardcoat films S01 to S43 were evaluated using the following evaluation methods.

(Film Thicknesses of Hardcoat Layers)

The film thickness of the hardcoat layer was computed by measuring the film thickness of the produced hardcoat film using a contact-type film thickness meter and subtracting the thickness of the support measured in the same method from the film thickness of the hardcoat film. For all of the hardcoat films S01 to S43, the film thicknesses of the hardcoat layers were 7.0 μm.

DPHA: KAYARAD DPHA (manufactured by Nippon Kayaku Co., Ltd.)

RMS-033: Silicone-based polyfunctional acrylate (manufactured by Gelest, Inc., Mwt=28,000)

IRGACURE127: Acylphosphine oxide-based photopolymerization initiator (manufactured by BASF)

Hollow silica particles: A hollow silica particle dispersion liquid (average particle size: 45 nm, refractive index: 1.25, the surface was treated using a silane coupling agent having an acryloyl group, a concentration of MEK dispersion liquid: 20%)

MEK: Methyl ethyl ketone

MMPG-Ac: Propylene glycol monomethyl ether acetate

The coating fluid for the layer of low refractive index was filtered using a polypropylene filter having a pore diameter of 1 μm, thereby preparing a coating fluid.

Next, the coating fluid for the layer of low refractive index Ln-1 was applied onto the side of the hardcoat film produced above on which the hardcoat layer had been provided by means of coating. The drying conditions of the layer of low refractive layer were 90° C. and 60 seconds, and, regarding the ultraviolet ray-curing conditions, the illuminance was set to 600 mW/cm$^2$ and the irradiance level was set to 300 mJ/cm$^2$ using a 240 W/cm air-cooling metal halide lamp (manufactured by Eye Graphics Co., Ltd.) while nitrogen was purged so as to obtain an atmosphere having an oxygen concentration of 0.1% by volume or less. The refractive index of the layer of low refractive index was 1.36, and the film thickness was 95 nm. The number of cissing spots in a 15 cm×20 cm area of the obtained film was counted. Here, a region in the surface of the underlayer on which the upper layer was not formed was considered as a cissing spot. On the basis of the results, evaluation was made using the following standards. The results were shown in Tables 3 and 4.

A: The number of cissing spots was one or less.
B: The number of cissing spots was two or more.

When the films are evaluated as the standard of A, the films have excellent production efficiency and can be preferably used.

(Agglomeration of Particles)

The entire haze of the produced hardcoat films was measured according to JIS-K7136, the agglomeration of particles in the hardcoat layers was evaluated, and determination was made using the following standards. The results were shown in Tables 3 and 4.

A: The haze value was less than 0.8%.
B: The haze value was 0.8% or more.

(Pencil Hardness)

The pencil hardness evaluation described in JIS K 5400 was carried out. The humidity of the hardcoat film was adjusted for two hours at a temperature of 25° C. and a humidity of 60% RH, and then the hardcoat film was scratched under a load of 4.9 N using 2H to 5H pencils for testing specified by JIS S 6006. Numerical values shown in the table indicate the number of times in which scratches were not generated when the hardcoat film was scratched five times using the respective pencils.

According to the number of times, determination was made using the following standards. The results are shown in Tables 3 and 4.

A: When the hardcoat film was scratched five times using the 4H pencil, a scratch was not generated in three or more times.
B: When the hardcoat film was scratched five times using the 3H pencil, a scratch was not generated in three or more times.
C: When the hardcoat film was scratched five times using the 3H pencil, a scratch was generated in three or more times.
D: When the hardcoat film was scratched five times using the 3H pencil, a scratch was generated in five times.
E: When the hardcoat film was scratched five times using the 2H pencil, a scratch was generated in five times.

(Contact Angle of Water)

A liquid droplet having a diameter of 1.0 mm was produced at a needle tip using pure water as a liquid in a dried state (20° C./65% RH) using a contact angle meter ["CA-X"-type contact angle meter, manufactured by Kyowa Interface Science Co., Ltd.] and was brought into contact with the surface of the film, thereby producing a liquid droplet on the film. The angle on a side including the liquid was considered as the contact angle using the angle formed between the contact line to the liquid surface and the film surface at a point at which the film and the liquid came into contact with each other and was measured.

The measured results are shown in Tables 3 and 4.

"Surface state" and "the agglomeration of particles" correspond to "smoothness", and "cissing" and "the contact angle of water" correspond to "hydrophilicity".

TABLE 3

| | Sample No. | S01 | S02 | S03 | S04 | S05 | S06 | S07 | S08 | S09 | S10 | S11 |
|---|---|---|---|---|---|---|---|---|---|---|---|---|
| | Hardcoat coating layer fluid No. | A01 | A02 | A03 | A04 | A05 | A06 | A07 | A08 | A09 | A10 | A11 |
| Evaluation result | Surface state of hardcoat layer | B | B | B | B | B | A | B | B | A | E | A |
| | Cissing when laminated above | A | A | A | A | A | A | A | A | A | A | A |
| | Agglomeration on or particles | A | A | A | A | A | A | A | A | A | A | B |
| | Pencil hardness (5H) | 0 | 0 | 0 | 0 | 0 | 0 | 0 | 0 | 0 | 0 | 0 |
| | Pencil hardness (4H) | 3 | 3 | 3 | 3 | 3 | 3 | 3 | 3 | 3 | 3 | 3 |
| | Pencil hardness (3H) | 5 | 5 | 5 | 5 | 5 | 5 | 5 | 5 | 5 | 5 | 5 |
| | Pencil hardness (2H) | 5 | 5 | 5 | 5 | 5 | 5 | 5 | 3 | 5 | 5 | 5 |

TABLE 3-continued

| | | | | | | | | | | | |
|---|---|---|---|---|---|---|---|---|---|---|---|
| Film | Pencil evaluation | A | A | A | A | A | A | A | A | A | A |
| | Water contact angle (°) | 64 | 61 | 63 | 63 | 61 | 62 | 64 | 63 | 60 | 63 | 61 |
| | Note | Example | Example | Example | Example | Example | Example | Example | Example | Example | Comparative Example | Comparative Example |

| | Sample No. | S12 | S13 | S14 | S15 | S16 | S17 | S18 | S19 | S20 | S21 |
|---|---|---|---|---|---|---|---|---|---|---|---|
| Evaluation result | Hardcoat coating layer fluid No. | A12 | A13 | A14 | A15 | A16 | A17 | A18 | A19 | A20 | A21 |
| | Surface state of hardcoat layer | A | A | A | A | A | A | A | A | A | A |
| | Cissing when laminated above | A | A | A | A | A | A | A | A | A | A |
| | Agglomeration on or particles | A | A | A | A | A | A | A | A | A | A |
| | Pencil hardness (5H) | 0 | 0 | 0 | 0 | 0 | 0 | 0 | 0 | 0 | 0 |
| | Pencil hardness (4H) | 3 | 3 | 3 | 0 | 5 | 0 | 0 | 1 | 0 | 0 |
| | Pencil hardness (3H) | 5 | 5 | 5 | 5 | 5 | 5 | 3 | 5 | 5 | 0 |
| | Pencil hardness (2H) | 5 | 5 | 5 | 5 | 5 | 5 | 5 | 5 | 5 | 2 |
| | Pencil evaluation | A | A | A | B | A | B | C | B | B | D |
| Film | Water contact angle (°) | 62 | 62 | 61 | 58 | 59 | 70 | 63 | 64 | 63 | 55 |
| | Note | Example | Example | Example | Example | Example | Comparative Example | Comparative Example | Example | Example | Comparative Example |

TABLE 4

| | Sample No. | S22 | S23 | S24 | S25 | S26 | S27 | S28 | S29 | S30 | S31 | S32 |
|---|---|---|---|---|---|---|---|---|---|---|---|---|
| Evaluation result | Hardcoat coating layer fluid No. | A22 | A23 | A24 | A25 | A26 | A27 | A28 | A29 | A30 | A31 | A32 |
| | Surface state of hardcoat layer | A | A | A | A | A | A | A | A | A | A | A |
| | Cissing when laminated above | A | A | A | A | A | A | A | A | A | A | A |
| | Agglomeration on or particles | A | A | A | A | A | A | A | A | A | A | A |
| | Pencil hardness (5H) | 0 | 0 | 0 | 0 | 0 | 0 | 0 | 0 | 0 | 0 | 0 |
| | Pencil hardness (4H) | 0 | 0 | 0 | 4 | 3 | 5 | 4 | 0 | 0 | 0 | 0 |
| | Pencil hardness (3H) | 0 | 0 | 0 | 5 | 5 | 5 | 5 | 0 | 0 | 0 | 0 |

TABLE 4-continued

| | | | | | | | | | | | |
|---|---|---|---|---|---|---|---|---|---|---|---|
| Film | Pencil hardness (2H) | 0 | 0 | 0 | 5 | 5 | 5 | 5 | 4 | 4 | 5 | 4 |
| | Pencil evaluation | E | E | E | A | A | A | A | D | D | D | D |
| | Water contact angle (°) | 49 | 51 | 42 | 62 | 61 | 60 | 62 | 61 | 61 | 61 | 61 |
| | Note | Comparative Example | Comparative Example | Comparative Example | Example | Example | Example | Example | Comparative Example | Comparative Example | Comparative Example | Comparative Example |

| | | | | | | | | | | | |
|---|---|---|---|---|---|---|---|---|---|---|---|
| | Sample No. | S33 | S34 | S35 | S36 | S37 | S38 | S39 | S40 | S41 | S42 | S43 |
| Evaluation result | Hardcoat coating layer fluid No. | A33 | A34 | A35 | A36 | A37 | A38 | A39 | A40 | A41 | A42 | A09 |
| | Surface state of hardcoat layer | A | C | A | A | D | A | A | D | A | A | A |
| | Cissing when laminated above | A | A | A | A | A | A | B | A | A | B | A |
| | Agglomeration on or particles | A | A | A | A | A | A | A | A | A | A | A |
| | Pencil hardness (5H) | 0 | 1 | 1 | 0 | 0 | 0 | 0 | 0 | 0 | 0 | 0 |
| | Pencil hardness (4H) | 0 | 5 | 5 | 0 | 5 | 5 | 5 | 5 | 5 | 5 | 3 |
| | Pencil hardness (3H) | 0 | 5 | 5 | 1 | 5 | 5 | 5 | 5 | 5 | 5 | 5 |
| | Pencil hardness (2H) | 4 | 5 | 5 | 5 | 5 | 5 | 5 | 5 | 5 | 5 | 5 |
| | Pencil evaluation | D | A | A | C | A | A | A | A | A | A | A |
| Film | Water contact angle (°) | 61 | 60 | 62 | 65 | 63 | 63 | 95 | 62 | 61 | 75 | 60 |
| | Note | Comparative Example | Comparative Example | Comparative Example | Comparative Example | Comparative Example | Example | Comparative Example | Comparative Example | Example | Comparative Example | Example |

INDUSTRIAL APPLICABILITY

The present invention provides a method for manufacturing a hardcoat film which has a highly hydrophilic surface and has excellent smoothness and hardness and a hardcoat film. Since the present invention is capable of manufacturing hardcoat films having a hardcoat layer which does not easily cause cissing in coating fluids for forming upper layers, it is possible to manufacture laminate films having a variety of functions.

The present invention has been described in detail with reference to specific embodiments, and it is evident to persons skilled in the art that a variety of modifications and corrections can be added within the spirit and scope of the present invention.

Priority is claimed on the basis of a Japanese patent application filed on Sep. 30, 2014 (JP2014-202477), the content of which is incorporated herein by reference.

What is claimed is:

1. A method for manufacturing a hardcoat film comprising a hardcoat layer having a surface of which a water contact angle is 65° or less, the method comprising:

applying a composition for forming the hardcoat layer on a base material film and drying and curing the composition,
wherein the composition for forming the hardcoat layer comprises at least following (a) to (d), and, in a case in which a total solid content of the composition for forming the hardcoat layer is set to 100% by mass, a content of the following (b) is 40% to 80% by mass, a content of the following (c) is 10% to 40% by mass, and a content of the following (d) is 10% to 40% by mass,
(a) a mixed solvent which is made by mixing a low-surface tension solvent having a surface tension of 10 to 22 mN/m and a standard-surface tension solvent having a surface tension of more than 22 mN/m and in which a content of the low-surface tension solvent is 5% by mass to 40% by mass of a total amount of the mixed solvent,
(b) a polymerizable compound which has three or more ethylenic unsaturated double-bonding groups in a molecule and in which an equivalent of the ethylenic unsaturated bonding groups is 80 to 130,
(c) inorganic fine particles having reactivity to epoxy groups or ethylenic unsaturated double-bonding groups, and (d) a compound which has one or more alicyclic epoxy groups in a molecule and a molecular weight of 300 or less.

2. The method for manufacturing a hardcoat film according to claim 1,
wherein the low-surface tension solvent comprises at least one selected from tert-butyl alcohol, tetrafluoroethylene, triethylamine, cyclopentane, heptane, methyl(nonafluorobutyl)ether, and ethyl(nonafluorobutyl)ether.

3. The method for manufacturing a hardcoat film according to claim 1,
wherein the low-surface tension solvent is tert-butyl alcohol.

4. The method for manufacturing a hardcoat film according to claim 1,
wherein the standard-surface tension solvent comprises at least one selected from methyl ethyl ketone, acetone, methyl isobutyl ketone, methyl acetate, cyclohexanone, and isopropyl acetate.

5. The method for manufacturing a hardcoat film according to claim 2,
wherein the standard-surface tension solvent comprises at least one selected from methyl ethyl ketone, acetone, methyl isobutyl ketone, methyl acetate, cyclohexanone, and isopropyl acetate.

6. The method for manufacturing a hardcoat film according to claim 3,
wherein the standard-surface tension solvent comprises at least one selected from methyl ethyl ketone, acetone, methyl isobutyl ketone, methyl acetate, cyclohexanone, and isopropyl acetate.

7. The method for manufacturing a hardcoat film according to claim 1,
wherein an average primary particle diameter of the inorganic fine particles (c) is 10 nm to 100 nm.

8. The method for manufacturing a hardcoat film according to claim 2,
wherein an average primary particle diameter of the inorganic fine particles (c) is 10 nm to 100 nm.

9. The method for manufacturing a hardcoat film according to claim 3,
wherein an average primary particle diameter of the inorganic fine particles (c) is 10 nm to 100 nm.

10. The method for manufacturing a hardcoat film according to claim 4,
wherein an average primary particle diameter of the inorganic fine particles (c) is 10 nm to 100 nm.

11. The method for manufacturing a hardcoat film according to claim 5,
wherein an average primary particle diameter of the inorganic fine particles (c) is 10 nm to 100 nm.

12. The method for manufacturing a hardcoat film according to claim 6,
wherein an average primary particle diameter of the inorganic fine particles (c) is 10 nm to 100 nm.

13. The method for manufacturing a hardcoat film according to claim 1,
wherein the compound (d) further has an ethylenic unsaturated double-bonding group.

14. The method for manufacturing a hardcoat film according to claim 2,
wherein the compound (d) further has an ethylenic unsaturated double-bonding group.

15. The method for manufacturing a hardcoat film according to claim 4,
wherein the compound (d) further has an ethylenic unsaturated double-bonding group.

16. The method for manufacturing a hardcoat film according to claim 5,
wherein the compound (d) further has an ethylenic unsaturated double-bonding group.

17. The method for manufacturing a hardcoat film according to claim 11,
wherein the compound (d) further has an ethylenic unsaturated double-bonding group.

\* \* \* \* \*